United States Patent
Veeraswamy et al.

(10) Patent No.: US 9,223,799 B1
(45) Date of Patent: Dec. 29, 2015

(54) LIGHTWEIGHT METADATA SHARING PROTOCOL FOR LOCATION TRANSPARENT FILE ACCESS

(75) Inventors: Sairam Veeraswamy, South Grafton, MA (US); Kallol Par, Westborough, MA (US); Linton Vadakedathu, Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,137

(22) Filed: Jun. 29, 2012

(51) Int. Cl.
  *G06F 17/30* (2006.01)
(52) U.S. Cl.
  CPC ................................. *G06F 17/30233* (2013.01)
(58) Field of Classification Search
  CPC . G06F 3/0604; G06F 3/064; G06F 17/30233; G06F 17/30194; G06F 17/30283; G06F 17/30067; G06F 17/30961; G06F 12/0868
  See application file for complete search history.

(56) References Cited

U.S. PATENT DOCUMENTS

| 7,313,579 | B2 * | 12/2007 | Murotani .............................. 1/1 |
| 7,783,615 | B1 | 8/2010 | Compton et al. |
| 8,539,008 | B2 * | 9/2013 | Faith et al. .................... 707/822 |
| 8,578,127 | B2 * | 11/2013 | Thatcher et al. .............. 711/202 |
| 2002/0133491 | A1 * | 9/2002 | Sim et al. ........................ 707/10 |
| 2007/0071213 | A1 | 3/2007 | Claudatos et al. |
| 2008/0162595 | A1 | 7/2008 | Kushwah et al. |
| 2008/0162685 | A1 | 7/2008 | Kushwah et al. |
| 2010/0241654 | A1 * | 9/2010 | Wu et al. ........................ 707/769 |
| 2011/0047132 | A1 | 2/2011 | Kilday et al. |
| 2012/0271799 | A1 * | 10/2012 | Barrall et al. ................. 707/649 |
| 2013/0086328 | A1 * | 4/2013 | Frank et al. ................... 711/125 |
| 2013/0226888 | A1 * | 8/2013 | Govind et al. ................ 707/698 |

* cited by examiner

*Primary Examiner* — Yuk Ting Choi
(74) *Attorney, Agent, or Firm* — BainwoodHuang

(57) ABSTRACT

A storage processor having access to published logical unit numbers of a common block file system mounted on another storage processor processes requests for a particular file system object of the common block file system using metadata objects of the common block file system cached in both storage processors to access storage units shared between the two storage processors.

19 Claims, 5 Drawing Sheets

LIGHTWEIGHT METADATA SHARING PROTOCOL FOR LOCATION TRANSPARENT FILE ACCESS

BACKGROUND

A storage system includes multiple storage processors sharing common storage devices. A conventional storage system includes a Common Block File System (CBFS) that is mounted on one storage processor (i.e. owning) cannot be mounted on other storage processors (i.e. non-owning) despite sharing the common storage devices. The files on the file system are exposed as Logic Units and the CBFS publishes Logical Unit Numbers (LUNs) of the file system referring to the file or objects to allow other storage processors to make reference to the files or objects.

The non-owning storage processor will receives requests for a file system object using the published LUN. When the non-owning processor receives a request for a LUN it does not own, the non-owning storage processor forwards the request to the owning storage processor for file system processing.

SUMMARY

Unfortunately, there are deficiencies with the above-described conventional storage system. In particular, having the non-owning storage processor forward all the requests for a file system object to the owning storage processor will cause multiple context switches in both the owning storage processor and the non-owning storage processor. The transfer of data between the storage processors also reduces bandwidth on both storage processors. Additionally, the backend controller and the CPU of the owning storage processor becomes saturated processing the requests.

In contrast to the above described conventional storage system, the improved technique provides lightweight access to file system objects by sharing among the extent cache of each of the storage processors, metadata objects used to access objects of the common block file system stored in common storage devices.

Advantageously, the improved technique reduces multiple context switches to satisfy the request for a file system object and evenly distributes I/O over the multiple storage processors sharing common storage devices.

One embodiment of the improved technique is directed to a method of satisfying a request for a particular file system object, by a second storage processor, in a common block file system bound to a first storage processor, a common message interface provided for communicating between the first storage processor and the second storage processor, the common block file system storing metadata objects arranged as a tree structure bound to the first storage processor.

Further, a cache of the second storage processor stores a portion of the tree structure in which the metadata objects are arranged. In particular, the leaf-node of the tree structure is stored in the cache of the second storage processor The method examines the request for the particular file system object for an instruction causing modification of any metadata object of the common block file system. If any instruction of the request causes a modification of metadata of the CBFS, forward the request for the particular file system object to the first storage processor (i.e. the storage processor that owns the CBFS) via the CMI and receive in return the particular file system object from the first storage processor via the CMI. If there is nothing that will modify the metadata, attempt service the request for a particular file system object locally by referencing a branch of the portion of the tree structure in order to seek a leaf node of the branch of the tree structure. The leaf node contains a metadata object including an identifier for physically satisfying the request for the particular file system object. Once the information is found, access the storage on which the particular file system object is stored by using the identifier for physically satisfying the request for the particular file system object. Now that the particular object has been retrieved locally or remotely, return the particular file system object to a requestor.

In another embodiment of the invention, a proxy storage processor locally accesses a particular file system object stored on a common block file system mounted on a primary storage processor, the storage processor includes a storage device storing objects of the common block file system including metadata objects arranged as a tree structure. An extent cache stores a portion of the tree structure in which the metadata objects are arranged. A common messaging interface provides communication with the primary storage processor. A controller circuit that provides access to objects of the common block file system, the controlling circuitry constructed and configured to perform the method described above.

In a further embodiment the method described above is embodied as a computer program stored on a non-transitory storage medium executed by a microprocessor.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
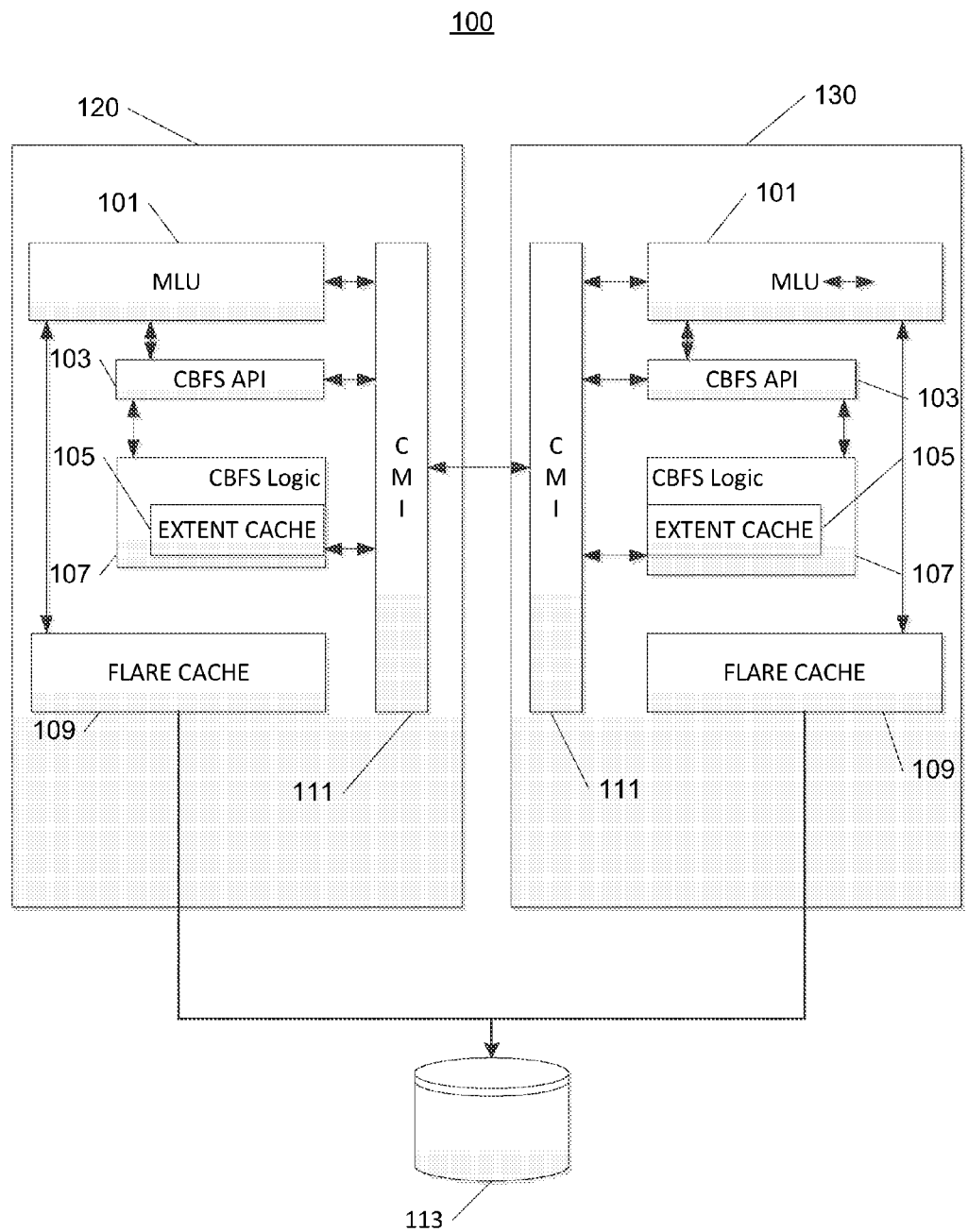
FIG. 1 is a schematic diagram illustrating a storage system including two storage processors.

FIG. 1 is a schematic diagram illustrating a storage system including two storage processors. The storage system 100 includes a first storage processor 120 and a second storage processor 130. The storage processors 120 and 130 each include a Mapped Logical Unit (MLU) 101 for mapping logical units (or LUNs) exposed by CBFS. The storage processors 120 and 130 further include a Common Block File System (CBFS) Application Programming Interface (API) 103 for receiving commands to access the CBFS.

The storage processors 120 and 130 further include the CBFS Logic 107 for controlling and accessing the storage containing the objects of the file system. A FLARE Cache 109 stores cache entries mapping logical addresses of an object of the file system to a physical address in a storage device 113 and Common Message Interface (CMI) 111 for passing message between the first storage processor and the second storage processor 130.

The CBFS exposes the logical unit number (LUN) of a file system object of the CBFS owned by one storage processor to multiple storage processors. A non-owning storage processor 130 receives a request to read a data block on the CBFS owned by storage processor 120 at a driver (not shown) which identifies among other things including the LUN. The driver determines the LUN for the object is not owned by storage processor 130 and passes the request to the CBFS API 103 which checks if the request for the file system object will cause metadata of the CBFS to be modified. If the metadata of the CBFS will be modified by the request for the file system object, then the request for the file system object is forwarded to the owning storage processor 120 to process the request.

If the metadata of the CBFS will not be modified by the request for the file system object, have the non-owning storage processor 130 check the extent cache 105 for a leaf node of the branch of the metadata objects of the file system that would satisfy the request for the file system object. Each extent-cache-entry on any either owning storage processor 120 or non-owning storage processor 130 indicates that a given file-range (or LUN-range) is available for mapping on either owning storage processor 120 or non-owning storage processor 130. If the leaf node exists then in the non-owning storage processor 130, use the logical address provided in the leaf node to translate the logical address to a physical address held in the FLARE Cache 109, using the physical address to access the storage device 113 locally. Each extent-cache-entry only contains a buffer-pointer, the buffer-pointer points to the actual leaf-node containing physical-addresses.

If the leaf node does not exist, the non-owning storage processor 130 requests that the owning storage processor 120 loads the required branch of the metadata objects of the file system that would satisfy the request for the file system object. Once the branch of the metadata objects of the file system that would satisfy the request for the file system object are loaded, use the logical address provided in the leaf node to translate the logical address to physical address using the FLARE Cache 109 so that storage device 113 may be accessed to satisfy the request.

Figure 2:
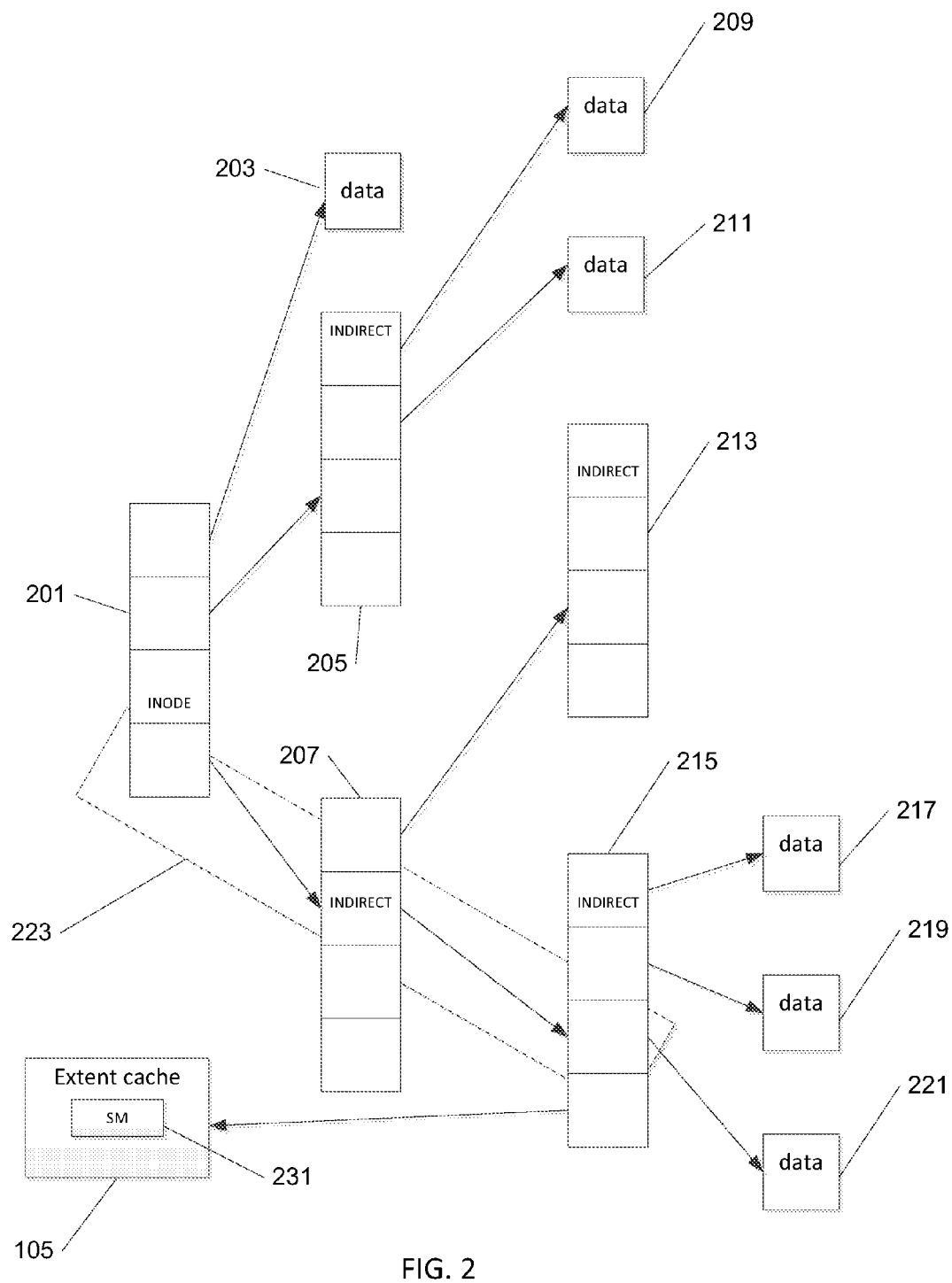
FIG. 2 is a block diagram illustrating the structure of the metadata required to access a data object.

FIG. 2 is a block diagram illustrating the structure of the metadata required to access a data object. In a request for file system object, data block 221 from among data blocks 203, 209, 211, 217, 219 and 221 is requested. It is assumed but not guaranteed that the node 215 of the tree structure of metadata is loaded in the extent cache 105. Other metadata blocks 105 and 213 are not assumed to be present in the extent cache 105.

When traversing the branch 223, the logic of the CBFS API 103 checks the extent cache 105 for the presence of the indirect block 207. If the indirect block 207 is present in the extent cache 105, then the logic can then check if the next element, indirect block 215, is loaded in the extent cache 105. If it is, then the CBFS API 103 in the non-owning storage processor 130 can use an identifier of the data block 221 by translating the logical address in the indirect block 215 to a physical address and performing I/O in the non-owning storage processor 130.

However, if during the walk of the branch of the tree structure 223 there is a missing node of the tree structure, for example, if indirect node 215 does not exist in the extent cache 105 of the storage processor 130, storage processor 130 requests the indirect block 215 from the storage processor 120 by making the request for the indirect block 215 across the CMI 111. The storage processor 120 loads the leaf-node 215 into its extent cache 105 which is then shared with the extent cache 105 in the storage processor 130.

On a cache miss, the CBFS Logic 107 on the non-owning storage processor 130 will have to make an explicit request to the owning CBFS storage processor 120 for caching the extents. To share the metadata objects in the extent cache 105 between the storage processor 120 and 130, include a state machine 231 tracking the cache entries.

Every non-owning storage processor (for example, storage processor 130) would maintain its own copy of the extent cache 105. On a cache miss, the non-owning storage processor 130 would explicitly request for the metadata objects (for read or write). The owning storage processor 120 shares the metadata objects and tracks the outstanding references granted, and then the non-owning storage processor 130 caches it locally and independently manages its local cache entry. References owned by the non-owning storage processor 130 is relinquished when the metadata objects entries on the local cache age out or the owning storage processor 120 would explicitly force a non-owning storage processor 130 holding the metadata object to yield.

As both the owning storage processor 120 and the non-owning storage processor 130 have copies of the cached metadata objects, a nexus between the objects of the owning storage processor 120 and the non-owning storage processor is created.

The owning storage processor 120 mounts the file system on bootstrap and 'publishes' the objects hosted by the file systems. The storage objects can be accessed from non-owning storage processor 130 only after establishing a nexus between the storage node and non-owning storage processor 130.

When there are multiple non-owning storage processors 130, there are multiple nexuses between storage objects hosted by the owning storage processor 120 and the proxy object on one or more non-owning storage processor 130. It should be understood that only one proxy object can be instantiated for a storage object on an owning storage processor 120. The storage object can be deleted only after releasing all the pending references on the object held by the proxy objects on the owning storage processor 120 and non-owning storage processor 130.

The nexus describes the association between a storage object and an instance of its proxy. The nexus is also used to describe the temporal association between the storage object and it's local client on the owning storage processor 120. Every storage object-proxy association is described by an instance of a nexus. The storage objects and their proxy objects track their nexus independently. The table below enumerates the various states of the nexus state machine 231.

| State | Description |
| --- | --- |
| IDLE | Indicates that there isn't any pending reference to this object. |
| ACTIVE-SHARED | The object is being actively shared/accessed from the local clients on the storage object and access nodes via the proxy objects. |
| ACTIVE_EXCLUSIVE | This object is being accessed exclusively by either the local or remote client (via the proxy object) |
| PROXY-SHARED | The proxy object has shared access to the associated storage object |
| PROXY_EXCLUSIVE | The proxy object has an exclusive access to the associated storage object |

The events asserted on the states of the nexus state machine are as follows:

| State | Description |
| --- | --- |
| REQUEST_SHARED | Requests for a shared access on the storage object |
| FREE_SHARED | Free the previously held shared access |
| REQUEST_EXCLUSIVE | Request for an exclusive access on the storage object |
| FREE_EXCLUSIVE | Free the exclusive access previously held |
| RELINQUISH | Force the access nodes to relinquish the references on the storage object |

Figure 3:
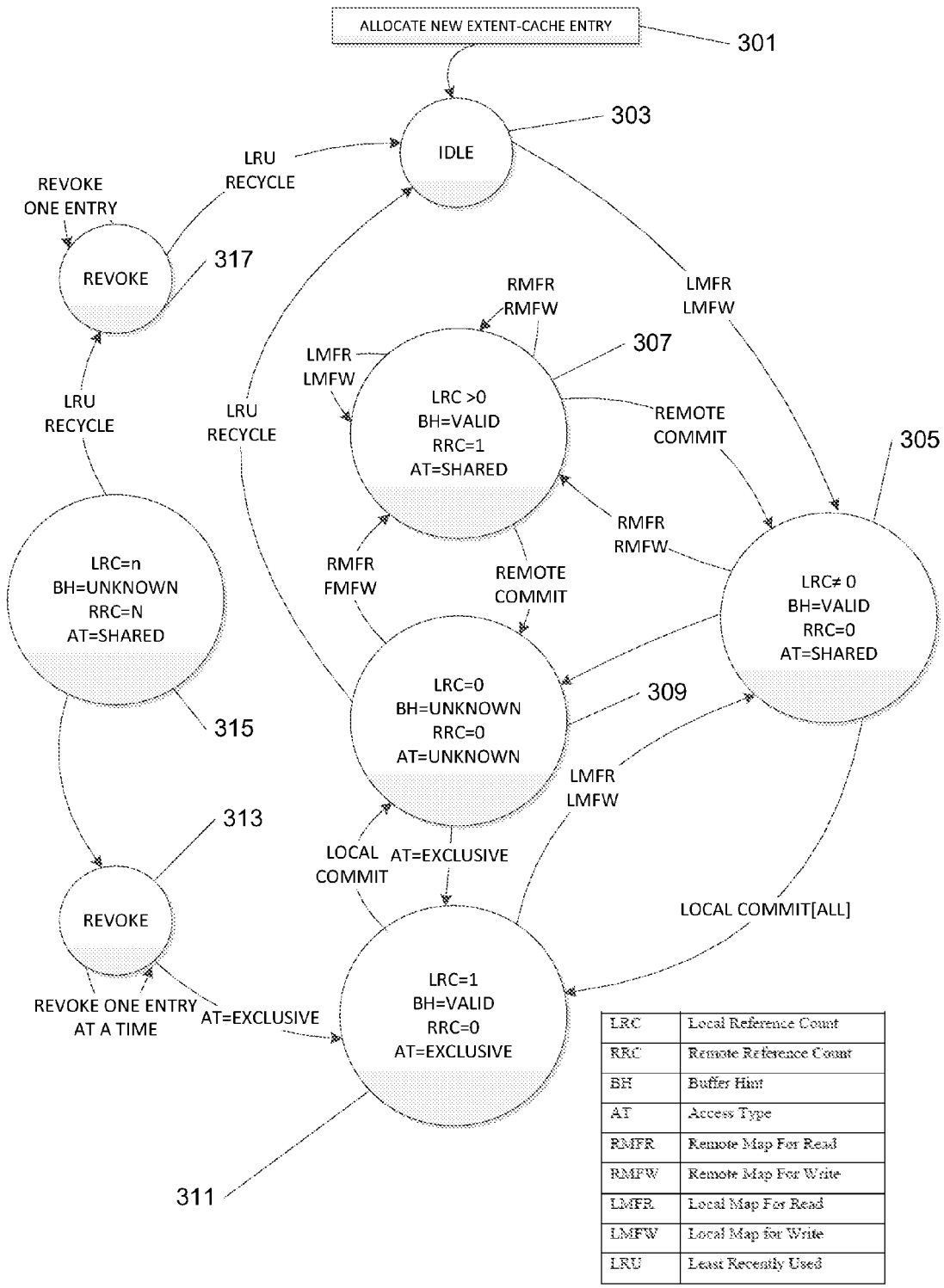
FIG. 3 is a block diagram illustrating the various states of the state machine controlling the objects of the cached metadata objects.

FIG. 3 is a block diagram illustrating the various states of the state machine controlling the objects of the cached metadata objects. The state transitions occur for any change in the local reference count (LRC) and the remote reference count (RRC). For example, a least recently used (LRU) operation which causes eviction from the extent cache 119 will have to perform a revoke operation on that cache entry to maintain cache-consistency.

All the states described below are common for both owning and non-owning storage processors. At step 301 a new extent cache entry is allocated in entent cache 105.

At state 303 there are no pending operations on the cache entry. The LRC and RRC have returned to zero. This state is also the initial state of a cache entry when it is first allocated. At state 305 there are local references made to the cache entry. This state is common for both owning and non-owning SPs and indicates local references on both SPs. At state 307, one or more remote references are made to a cache entry with pending local references. At state 309, both local and remote references have been released in this state the Buffer hint could potentially become invalid based on system load. Next state 311 is used for exclusive operations only. There are no remote-references pending on the cache entry at this time. It is primarily driven by the owning-SP. At state 315, the owning storage processor 120 needs to perform an exclusive operation, this state indicates a revoke-in-progress. Finally in state 317 the LRC and RRC are both non-zero, an exclusive operation will transition this entry to state 311 via state 313. A recycle operation would require a revoke (state 317) before the entry is available for use. In state 317 the entry is undergoing a revoke operation for LRU recycling, it is not available for general use.

Figure 4:
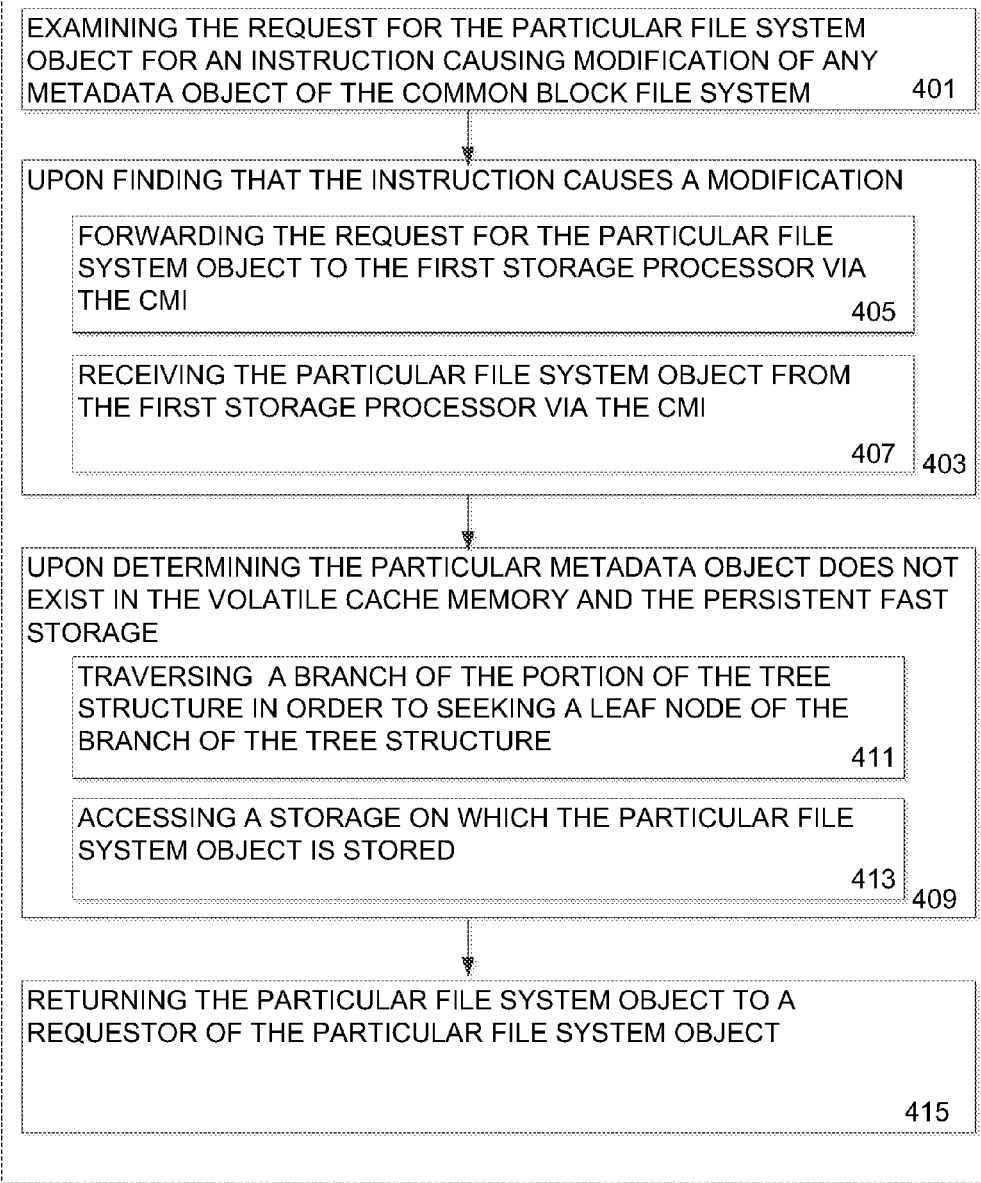
FIG. 4 is a flow chart illustrating a method of satisfying a request for a particular file system object, by a second storage processor, in a common block file system bound to a first storage processor.

FIG. 4 is a flow chart illustrating a method of satisfying a request for a particular file system object, by a second storage processor 130, in a common block file system bound to a first storage processor 120.

At step 401, a request for the particular file system object 221 for an instruction causing modification of any metadata object of the common block file system is examined. If there is an instruction that causes a modification of the metadata, then at step 405 forward the request for the particular file system object 221 to the first storage processor 120 via the CMI 111. The first storage processor 120 is the storage processor that mounts or owns the CBFS and it returns the particular data object 221. At step 407, the storage processor 130 receives the particular file system object from the first storage processor 120 via the CMI 111.

If there is no instruction in the request for the particular file system object 221 that causes the instruction causes the modification of metadata of the CBFS, at step 411 referencing a branch 223 of the portion of the tree structure 200 in order to seek a leaf node 215 of the branch of the tree structure 200, the leaf node 215 containing a metadata object including an identifier for physically satisfying the request for the particular file system object 221. Then at step 413, access a storage on which the particular file system object 221 is stored by using the identifier for physically satisfying the request for the particular file system object 221. Either having retrieved the particular file system object 221 by direct access or by requesting it from the storage processor 120, at step 415, return the particular file system object 221 to a requestor of the particular file system object 221.

Figure 5:
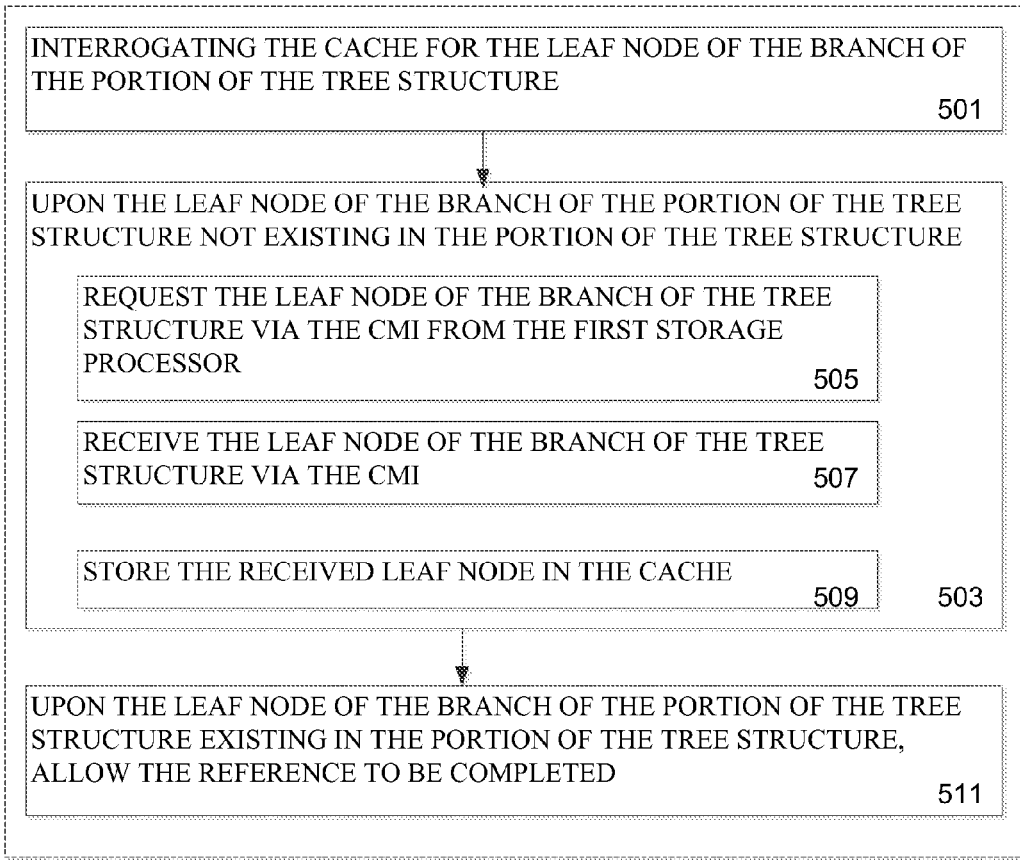
FIG. 5 is a flow chart illustrating a method of referencing a leaf node of an entry in the extent cache.

FIG. 5 is a flow chart illustrating a method of referencing a leaf node of an entry in the extent cache.

At step 503, interrogate the cache for the leaf node of the branch of the portion of the tree structure. If (503) the leaf node of the branch of the portion of the tree structure does not exist in the portion of the tree structure, then at step 505 request the leaf node of the branch of the tree structure via the CMI from the first storage processor. At step 507, receive the leaf node of the branch of the tree structure via the CMI. Then at step 507, store the received leaf node in the cache. Otherwise, if (511) the leaf node of the branch of the portion of the tree structure exists in the portion of the tree structure, allow the reference to be completed.

What is claimed is:

1. A method of satisfying a request for a particular file system object, by a second storage processor having a cache, in a common block file system bound to a first storage processor, a common message interface (CMI) provided for communicating between the first storage processor and the second storage processor, the method comprising:
examining the request for the particular file system object for an instruction leading to modification of a metadata object of the common block file system, the common block file system having metadata objects arranged as a tree structure, a copied portion of the tree structure being stored in the cache of the second storage processor;
upon finding that the request includes an instruction leading to a modification of the metadata object of the common block file system:
forwarding the request for the particular file system object to the first storage processor via the CMI to enable the first storage processor to physically satisfy the request for the particular file system object;
upon not finding that the request includes an instruction leading to such a modification:
referencing a leaf node of a branch of the portion of the tree structure, the leaf node containing the metadata object including an identifier for physically satisfying the request for the particular file system object; and
accessing the particular file system object using the identifier for physically satisfying the request for the particular file system object; and
returning the particular file system object to a requestor of the particular file system object;
wherein the identifier is a logical address pointing to a physical address in a nonvolatile storage medium at which the particular file system object is stored, the logical address being assigned to the physical address by the common block file system,
wherein a second common block file system is bound to the second storage processor,
wherein the second storage processor is constructed and arranged to store, in the cache of the second storage processor, (i) copies of first metadata objects, the first metadata objects including first indirect blocks containing pointers to physical blocks of files of the common block file system and (ii) second metadata objects, the second metadata objects including indirect blocks containing pointers to physical blocks of files of the second common block file system, the first metadata objects including the metadata object that includes the identifier for physically satisfying the request for the particular file system object, and wherein the first storage processor has a cache, the first storage processor being constructed and arranged to store, in the cache of the first storage processor, (i) copies of the second metadata objects and (ii) the first metadata objects.

2. The method of claim 1, wherein referencing the leaf node, further includes:

interrogating the cache for the leaf node of the branch of the portion of the tree structure;

upon the leaf node of the branch of the portion of the tree structure not existing in the portion of the tree structure:
requesting the leaf node of the branch of the tree structure via the CMI from the first storage processor;
receiving the leaf node of the branch of the tree structure via the CMI; and
storing the received leaf node in the cache; and upon the leaf node of the branch of the portion of the tree structure existing in the portion of the tree structure, allowing the reference to be completed.

3. The method of claim 2, wherein referencing the leaf node further includes:

incrementing a local reference count in a cache object controlling the leaf node of portion of the tree structure.

4. The method of claim 1, further includes:

decrementing a local reference count in a cache object controlling the leaf node of portion of the tree structure after returning the particular file system object.

5. A method as in claim 1, wherein file system objects and metadata objects are contained in leaf nodes of branches of the tree structure, and other nodes of branches of the tree structure only contain indirect blocks;

wherein referencing the leaf node of the branch of the portion of the tree structure includes:
at a node of the branch, checking for a presence of an indirect block in an extent cache of the second storage processor,
if there is an indirect block present in the extent cache, further traversing the branch to the next node of the branch, and
if there is not an indirect block in the branch, requesting the indirect block from the first storage processor.

6. A method as in claim 5, wherein further traversing the branch to the next node of the branch includes:
translating a logical address of an indirect block in the next node of the branch to a physical address in storage, and
performing an I/O operation in the first storage processor.

7. A data storage system, comprising:

a primary storage processor on which a common block file system is mounted;

a secondary storage processor locally accessing a particular file system object stored in the common block file system;

a storage device storing objects of the common block file system including metadata objects arranged as a tree structure;

an extent cache of the secondary storage processor storing a portion of the tree structure in which the metadata objects are arranged; and a common messaging interface (CMI) for communication between the primary storage processor and the secondary storage processor;

controlling circuitry of the secondary storage processor, the controlling circuitry constructed and configured to:
examine a request for the particular file system object for an instruction leading to modification of a metadata object of the common block file system;
upon finding that the request includes an instruction leading to a modification of the metadata object of the common block file system:
forward the request for the particular file system object to the first storage processor via the CMI to enable the first storage processor to physically satisfy the request for the particular file system object;
upon not finding that the request includes an instruction leading to such a modification:
reference a leaf node of the portion of the tree structure, the leaf node containing the metadata object including an identifier for physically satisfying the request for the particular file system object; and
access the particular file system object using the identifier for physically satisfying the request for the particular file system object; and
return the particular file system object to a requestor of the particular file system object;

wherein the identifier is a logical address pointing to a physical address in a nonvolatile storage medium at which the particular file system object is stored, the logical address being assigned to the physical address by the common block file system;

wherein a second common block file system is bound to the secondary processor, wherein the controlling circuitry of the secondary storage processor is further constructed and arranged to store, in the extent cache of the secondary storage processor, (i) copies of first metadata objects, the first metadata objects including first indirect blocks containing pointers to physical blocks of files of the common block file system and (ii) second metadata objects, the second metadata objects including indirect blocks containing pointers to physical blocks of files of the second common block file system, the first metadata objects including the metadata object that includes the identifier for physically satisfying the request for the particular file system object, and wherein the primary storage processor includes an extent cache, the primary storage processor including controlling circuitry constructed and arranged to store (i) copies of the second metadata objects and (ii) the first metadata objects.

8. The data storage system of claim 7, wherein the controlling circuitry constructed and arranged to reference the leaf node is further constructed and arranged to:

interrogate the cache for the existence of the leaf node;

upon the leaf node of the branch of the portion of the tree structure not existing in the cache:
request a leaf node of the branch of the tree structure via the CMI from the first storage processor;
receive the next metadata object of the branch of the tree structure of metadata objects via the CMI; and
store the received leaf node in the cache; and upon the leaf node of the branch of the portion of the tree structure existing in the portion of the tree structure, allow the reference to be completed.

9. The data storage system of claim 8, wherein the controlling circuitry constructed and arranged to reference the leaf node is further constructed and arranged to:
increment a local reference count in a cache object controlling the leaf node of the portion of the tree structure.

10. The data storage system of claim 7, wherein the controlling circuitry is further constructed and arranged to:
decrement a local reference count in a cache object controlling the leaf node of the portion of the tree structure after the return of the particular file system object.

11. A data storage system as in claim 7, wherein the controlling circuitry of the primary storage processor is further constructed and arranged to store, in the extent cache of the primary storage processor, a local reference count indicating how many references to the metadata object have been made without returning the particular file system object, and
wherein the controlling circuitry of the secondary storage processor is further constructed and arranged to store, in the extent cache of the secondary storage processor, a remote reference count indicating how many references to the metadata object have been made by the secondary storage processor without returning the particular file system object.

12. A data storage system as in claim 7, wherein the controlling circuitry of the secondary storage processor is further constructed and arranged to:
store, in the extent cache of the secondary storage processor, a value of an access type indicator indicating whether an access of the metadata object is shared or exclusive, shared access of the metadata object indicating that the metadata object is accessed by at least one of the primary storage processor and the secondary storage processor, exclusive access of the metadata object indicating that the metadata object is accessed by one of the primary storage processor and the secondary storage processor, and
change the value of the access type indicator in response to a change in either the local reference count or the remote reference count.

13. A data storage system as in claim 7, wherein the controlling circuitry of the primary storage processor is further constructed and arranged to, in response to receiving the request for the particular file system object to the first storage processor, verify that the remote reference count is zero prior to carrying out the request.

14. A data storage system as in claim 7, wherein the controlling circuitry of the secondary storage processor is further constructed and arranged to, in response to a removal of a least-recently-used (LRU) first metadata object in the extent cache of the primary storage processor, remove the copy of the first metadata object from the extent cache of the secondary storage processor.

15. A data storage system as in claim 7, wherein the secondary storage processor further includes a flare cache storing a mapping table having entries, each entry of the mapping table including (i) a second logical address stored in the extent cache of the primary processor and (ii) the physical address of the first file system object to which the first logical address points, the first logical address being stored in the first extent cache within a first metadata object, and
wherein the controlling circuitry of the secondary storage processor constructed and arranged to access the particular file system object using the identifier is further constructed and arranged to (i) locate the entry of the mapping table containing the logical address of the referenced leaf node and (ii) use the physical address of the entry to access the particular file system object.

16. A non-transitory computer readable storage medium with a computer program stored thereon, the computer program executed by a second storage processor performing a method of satisfying a request for a particular file system object in a common block file system bound to a first storage processor, a common message interface (CMI) provided for communicating between the first storage processor and the second storage processor, the method comprising:
examining the request for the particular file system object for an instruction leading to modification of a metadata object of the common block file system, the common block file system having metadata objects arranged as a tree structure, a copied portion of the tree structure being stored in the cache of the second storage processor;
upon finding that the request includes an instruction leading to a modification of the metadata object of the common block file system:
forwarding the request for the particular file system object to the first storage processor via the CMI to enable the first storage processor to physically satisfy the request for
the particular file system object;
upon not finding that the request includes an instruction leading to such a modification:
referencing a leaf node of a branch of the portion of the tree structure, the leaf node containing the metadata object including an identifier for physically satisfying the request for the particular file system object; and
accessing the particular file system object using the identifier for physically satisfying the request for the particular file system object; and
returning the particular file system object to a requestor of the particular file system object;
wherein the identifier is a logical address pointing to a physical address in a nonvolatile storage medium at which the particular file system object is stored, the logical address being assigned to the physical address by the common block file system;
wherein a second common block file system is bound to the second storage processor,
wherein the second storage processor is constructed and arranged to store, in the cache of the second storage processor, (i) copies of first metadata objects, the first metadata objects including first indirect blocks containing pointers to physical blocks of files of the common block file system and (ii) second metadata objects, the second metadata objects including indirect blocks containing pointers to physical blocks of files of the second common block file system, the first metadata objects including the metadata object that includes the identifier for physically satisfying the request for the particular file system object, and
wherein the first storage processor has a cache, the first storage processor being constructed and arranged to store, in the cache of the first storage processor, (i) copies of the second metadata objects and (ii) the first metadata objects.

17. The non-transitory computer readable storage medium of claim 16, wherein referencing the leaf node of the branch of the tree structure in the portion of the tree structure stored in the cache seeking the leaf node, further includes:
interrogating the cache for the existence of the leaf node of the branch of the portion of the tree structure;
upon the leaf node of the branch of the portion of the tree structure not existing in the portion of the tree structure:
requesting the leaf node of the branch of the tree structure via the CMI from the first storage processor;

receiving the leaf node of the branch of the tree structure via the CMI; and storing the received leaf node in the cache; and setting the next node as the current node;

upon the leaf node of the branch of the portion of the tree structure existing in the portion of the tree structure, allowing the reference to be completed.

18. The non-transitory computer readable storage medium of claim 16, wherein referencing the leaf node further includes:

incrementing a local reference count in a cache object controlling the leaf node of portion of the tree structure after returning the particular file system object.

19. The non-transitory computer readable storage medium of claim 16, further includes:

decrementing a local reference count in a cache object controlling the leaf node of the portion of the tree structured.

\* \* \* \* \*